(12) United States Patent
Kuester et al.

(10) Patent No.: US 7,788,632 B2
(45) Date of Patent: Aug. 31, 2010

(54) METHODS AND SYSTEMS FOR EVALUATING THE COMPLIANCE OF SOFTWARE TO A QUALITY BENCHMARK

(75) Inventors: Anthony E. Kuester, Vienna, VA (US); Wanda L. Key, Haymarket, VA (US); Lillian Zelinski, Alexandria, VA (US)

(73) Assignee: United States Postal Service, Washington, DC (US)

( * ) Notice: Subject to any disclaimer, the term of this patent is extended or adjusted under 35 U.S.C. 154(b) by 1002 days.

(21) Appl. No.: 11/445,201

(22) Filed: Jun. 2, 2006

(65) Prior Publication Data

US 2007/0006161 A1      Jan. 4, 2007

Related U.S. Application Data

(60) Provisional application No. 60/686,393, filed on Jun. 2, 2005.

(51) Int. Cl.
*G06F 9/44* (2006.01)
*G06F 9/45* (2006.01)

(52) U.S. Cl. .................. 717/100; 717/101; 717/120
(58) Field of Classification Search ......... 717/100–106, 717/120–124, 203–204
See application file for complete search history.

(56) References Cited

U.S. PATENT DOCUMENTS

| | | | |
|---|---|---|---|
| 5,428,788 A * | 6/1995 | Schwanke | 717/120 |
| 5,446,895 A * | 8/1995 | White et al. | 717/101 |
| 5,485,621 A * | 1/1996 | Schwanke | 717/121 |
| 5,500,795 A | 3/1996 | Powers et al. | |
| 5,907,704 A * | 5/1999 | Gudmundson et al. | 717/100 |
| 6,438,594 B1 * | 8/2002 | Bowman-Amuah | 709/225 |
| 6,532,586 B1 * | 3/2003 | Negoro | 717/105 |
| 6,601,233 B1 * | 7/2003 | Underwood | 717/102 |
| 6,618,852 B1 * | 9/2003 | van Eikeren et al. | 717/108 |
| 6,671,874 B1 | 12/2003 | Passova | |
| 6,904,449 B1 * | 6/2005 | Quinones | 709/203 |
| 7,047,518 B2 * | 5/2006 | Little et al. | 717/108 |
| 7,149,734 B2 * | 12/2006 | Carlson et al. | 707/6 |
| 7,240,327 B2 * | 7/2007 | Singh et al. | 717/108 |
| 7,272,823 B2 * | 9/2007 | Ball | 717/125 |
| 7,430,498 B2 * | 9/2008 | Butterfield et al. | 703/2 |
| 7,448,020 B2 * | 11/2008 | Kohno | 717/104 |
| 7,472,373 B2 * | 12/2008 | McKethan | 717/101 |

(Continued)

OTHER PUBLICATIONS

Mitchell et al, "A comparison of software cost duation and quality for waterfall vs iterative and incremental development: A systematic review", IEEE, pp. 511-515, 2009.*

(Continued)

*Primary Examiner*—Anil Khatri
(74) *Attorney, Agent, or Firm*—Lewis and Roca LLP

(57) ABSTRACT

A method for evaluating the compliance of software to a standard quality process includes establishing a standard quality process that includes a plurality of stages, each of the plurality of stages corresponding to a software development process. A plurality of objective qualifiers associated with the standard quality process are defined, and a weighting factor is assigned to each of the plurality of objective qualifiers. The method also includes applying each of the plurality of objective qualifiers to a software application, and determining a field worthiness score corresponding to the correlation of the software application with each of the objective qualifiers.

39 Claims, 7 Drawing Sheets

U.S. PATENT DOCUMENTS

| | | | |
|---|---|---|---|
| 7,627,855 B2 * | 12/2009 | Inoue et al. ................. | 717/120 |
| 2003/0097308 A1 | 5/2003 | Connors et al. | |
| 2004/0243968 A1 | 12/2004 | Hecksel | |
| 2005/0015675 A1 | 1/2005 | Kolawa et al. | |

OTHER PUBLICATIONS

Chang et al, "A case study of pattern based software framework to improve the quality of software development", ACM SAC, pp. 443-447, 2009.*

Sharma et al, "Estimation of quality for software components an emprical approach", ACM SIGSOFT, vo. 33, No. 6, pp. 1-10, 2008.*

Bachmann et al, :Software process data quality and characterstics a historical view on open and closed source projects, ACM IWPSE pp. 119-128, 2009.*

Thurman, Dave, "What Gets Measured Gets Done," Hoosier Banker, Vol. 83, Issue 4 (Apr. 1999) (6 pages).

Written Opinion of the International Searching Authority mailed Sep. 4, 2007 in corresponding International Patent Application PCT/US2006/21534, 4 pages.

International Preliminary Report on Patentability dated Dec. 6, 2007 in corresponding International Patent Application PCT/US2006/21534, 5 pages.

International Search Report dated Sep. 4, 2007 in corresponding International Patent Application PCT/US2006/21534, 3 pages.

* cited by examiner

UNITED STATES POSTAL SERVICE

ENGINEERING SOFTWARE PROCESS MANAGEMENT
AUTOMATION EQUIPMENT PROGRAMS (AEP)
FIELD WORTHINESS EVALUATION REPORT

| GENERAL INFORMATION |
|---|
| SOFTWARE RELEASE ID: (ACRONYM/VERSION #) |
| ACQUISITION ORGANIZATION: |
| DESIGN COGNZANT ORGANIZATION (DCO): |
| PROGRAM MANAGER: |
| PRIMARY DEVELOPER/VENDOR: |

FIELD WORTHINESS EVALUATION SCORING CRITERIA

REQUIREMENTS DEFINITION PHASE

| ACTIVITY/DOCUMENT | | SCORE MAX | ACTUAL | RATIONALE (ENTER DOCUMENT ID AND/OR RATIONALE FOR SCORE) | POC (SCORER'S INITIALS) |
|---|---|---|---|---|---|
| 1.1 | CAPABILITY EVALUATION | 4 | 4.0 | C5; C13; C19 | LJL |
| 1.2 | SOW/TASK ORDER | 8 | 8.0 | c34; c40; c46; c52; c58; c64; c70; c76; c82; c88; c94; c100 | JLJ |
| 1.3 | SW REQUIREMENTS SPECIFICATION | 8 | 8.0 | 114; 120; 126; 132; 138; 144 | LJL |
| 1.4 | SYSTEM/SUBSYSTEM DESIGN DESCRIPTION | 4 | 4.0 | 158; 163; 169; 174; 179 | LJL |
| | SCORE | 24 | 24.0 | | |

PROJECT PLANNING AND DESIGN PHASE

| ACTIVITY/DOCUMENT | | SCORE MAX | ACTUAL | RATIONALE (ENTER DOCUMENT ID AND/OR RATIONALE FOR SCORE) | POC (SCORER'S INITIALS) |
|---|---|---|---|---|---|
| 2.1 | SCMP | 4 | 4.0 | 4; 10; 15; 20 | JLJ |
| 2.2 | SOFTWARE DESIGN DESCRIPTION | 6 | 6.0 | 32; 37; 43; 49; 54 | JLK |
| 2.3 | REQUIREMENTS TRACEABILITY MATRIX | 6 | 6.0 | 65; 71; 77; 83 | RJR |
| 2.4 | SOFTWARE TEST PLANS | 6 | 6.0 | 96; 104; 114 | WHP |
| 2.5 | SDP/SCHEDULE | 4 | 4.0 | 132; 138; 144; 150; 156 | LJL |
| 2.6 | AEP SCHEDULE | 1 | 1.0 | 173 | RAL |
| 2.7 | SOFTWARE QUALITY ASSURANCE PLAN | 3 | 3.0 | 177; 183; 189; 197 | LJL |
| | SCORE | 30 | 30.0 | | |

BUILD PHASE

| ACTIVITY/DOCUMENT | | SCORE MAX | ACTUAL | RATIONALE (ENTER DOCUMENT ID AND/OR RATIONALE FOR SCORE) | POC (SCORER'S INITIALS) |
|---|---|---|---|---|---|
| 3.1 | SVD | 4 | 4.0 | 5; 10; 16; 28; 40 | LJL |
| 3.2 | PDE | 5 | 5.0 | 54; 59; 65; 71 | JLJ |
| 3.3 | SOFTWARE RELEASE ARCHIVE | 4 | 4.0 | 84; 94; 99 | RWC |
| 3.4 | SOFTWARE TEST DESCRIPTIONS | 5 | 5.0 | 111; 119; 127; 135; 143 | WHP |
| | SCORE | 18 | 18.0 | | |

TEST PHASE

| ACTIVITY/DOCUMENT | | SCORE MAX | ACTUAL | RATIONALE (ENTER DOCUMENT ID AND/OR RATIONALE FOR SCORE) | POC (SCORER'S INITIALS) |
|---|---|---|---|---|---|
| 4.1 | INDEPENDENT BUILD/AUDIT | 6 | 6.0 | 5; 16; 22; 28; 34 | MMLL |
| 4.2 | SVD VALIDATION | 4 | 4.0 | 50; 62; 76 | JKE |
| 4.3 | IN-PLANT TEST RESULTS | 7 | 7.0 | 90; 98; 102; 108; 118; 127; 135 | JKJ |
| 4.4 | FIRST ARTICLE TEST RESULTS | 6 | 6.0 | 148; 154; 160; 166; 176; 185; 193 | HNT |
| | SCORE | 23 | 23.0 | | |

DELIVER PHASE

| ACTIVITY/DOCUMENT | | SCORE MAX | ACTUAL | RATIONALE (ENTER DOCUMENT ID AND/OR RATIONALE FOR SCORE) | POC (SCORER'S INITIALS) |
|---|---|---|---|---|---|
| 5.1 | PRODUCT ANNOUNCEMENT | 2 | 2.0 | 4 | GWP |
| 5.2 | DELIVERABLES SCHEDULE | 3 | 3.0 | 21; 32 | SH |
| | SCORE | 5 | 5.0 | | |

| OVERALL SCORE (BASED ON SUM OF SCORING CRITERIA) = 100 |
|---|
| GENERAL COMMENTS: |

| SOFTWARE PROCESS MANAGEMENT, IMPLEMENTATION MANAGER SIGNATURE | DATE |
|---|---|
| SOFTWARE PROCESS MANAGEMENT, PROCESS PLANNING AND POLICY MANAGER SIGNATURE | DATE |

FIGURE 5

| ENGINEERING SOFTWARE PROCESS MANAGEMENT MAIL PROCESSING EQUIPMENT (MPE) FIELD WORTHINESS EVALUATION REPORT |
|---|
| GENERAL INFORMATION |
| SOFTWARE RELEASE ID: (ACRONYM/VERSION #) |
| DESIGN COGNIZANT ORGANIZATION (DCO): |
| PROJECT MANAGER: |
| PRIAMRY DEVELOPER/VENDOR |

FIELD WORTHINESS EVALUATION SCORING CRITERIA

REQUIREMENTS DEFINITION PHASE

| ACTIVITY/DOCUMENT | | SCORE MAX | ACTUAL | RATIONALE (ID AND/OR RATIONALE FOR SCORE) | POC (SCORER'S INITIALS) |
|---|---|---|---|---|---|
| 1.1 | PAST PERFORMANCE EVALUATION | 4 | 0.0 | : : | 0 |
| 1.2 | CHANGE REQUEST PROCESS | 5 | 0.0 | : : | 0 |
| 1.3 | SOW/TASK ORDER | 4 | 0.0 | : : : | 0 |
| 1.4 | SW REQUIREMENTS SPECIFICATION | 8 | 0.0 | : : : | 0 |
| SCORE | | 21 | 0 | | |

PROJECT PLANNING AND DESIGN PHASE

| ACTIVITY/DOCUMENT | | SCORE MAX | ACTUAL | RATIONALE (ENTER DOCUMENT ID AND/OR RATIONALE FOR SCORE) | POC (SCORER'S INITIALS) |
|---|---|---|---|---|---|
| 2.1 | SCMP | 3 | 0.0 | : | 0 |
| 2.2 | SOFTWARE DESIGN | 5 | 0.0 | | 0 |
| 2.3 | REQUIREMENTS TRACEABILITY MATRIX | 7 | 0.0 | : : | 0 |
| 2.4 | SMTP | 10 | 0.0 | : : : : : | 0 |
| 2.5 | SDP/SCHEDULE | 4 | 0.0 | : : : | 0 |
| 2.6 | MPE/SCHEDULE | 1 | 0.0 | | 0 |
| | SCORE | 30 | 0 | | |

BUILD PHASE

| ACTIVITY/DOCUMENT | | SCORE MAX | ACTUAL | RATIONALE (ENTER DOCUMENT ID AND/OR RATIONALE FOR SCORE) | POC (SCORER'S INITIALS) |
|---|---|---|---|---|---|
| 3.1 | SVD | 5 | 0.0 | : : | 0 |
| 3.2 | PDE | 5 | 0.0 | : : | 0 |
| 3.3 | SOFTWARE RELEASE ARCHIVE | 4 | 0.0 | : : | 0 |
| | SCORE | 14 | 0 | | |

TEST PHASE

| ACTIVITY/DOCUMENT | | SCORE MAX | ACTUAL | RATIONALE (ENTER DOCUMENT ID AND/OR RATIONALE FOR SCORE) | POC (SCORER'S INITIALS) |
|---|---|---|---|---|---|
| 4.1 | FIELD ANNOUNCEMENT | 4 | 0.0 | | 0 |
| 4.2 | INDEPENDENT BUILD/AUDIT | 6 | 0.0 | : : : | 0 |
| 4.3 | SVD VALIDATION | 5 | 0.0 | : : | 0 |
| 4.4 | BETA TEST RESULTS | 10 | 0.0 | : : : : : | 0 |
| | SCORE | 25 | 0 | | |

DELIVER PHASE

| ACTIVITY/DOCUMENT | | SCORE MAX | ACTUAL | RATIONALE (ENTER DOCUMENT ID AND/OR RATIONALE FOR SCORE) | POC (SCORER'S INITIALS) |
|---|---|---|---|---|---|
| 5.1 | FINAL FIELD NOTIFICATION | 4 | 0.0 | : : | 0 |
| 5.2 | ENGINEERING SOFTWARE CHANGE ORDER (ESCO) | 2 | 0.0 | | 0 |
| 5.3 | SOFTWARE MEDIA DUPLICATION COORDINATED | 2 | 0.0 | : : | 0 |
| 5.4 | AUTHORIZED TO INSTALL SOFTWARE | 2 | 0.0 | : | 0 |
| | SCORE | 10 | 0 | | |

| OVERALL SCORE (BASED ON SUM OF SCORING CRITERIA) | = | 0 |
|---|---|---|
| GENERAL COMMENTS: | | |

| SOFTWARE PROCESS MANAGMENT, IMPLEMENTATION MANAGER SIGNATURE | DATE |
|---|---|
| SOFTWARE PROCESS MANAGMENT, PROCESS PLANNING AND POLICY MANAGER SIGNATURE | DATE |

FIGURE 6

METHODS AND SYSTEMS FOR EVALUATING THE COMPLIANCE OF SOFTWARE TO A QUALITY BENCHMARK

RELATED APPLICATIONS

This application claims the benefit of the filing date of U.S. Provisional Application No. 60/686,393, filed Jun. 2, 2005, titled "Methods and Systems for Evaluating the Compliance of a Software to a Quality Benchmark," by Anthony E. Kuester, Wanda L. Key, and Lillian Zelinski, incorporated in its entirety herein by reference.

TECHNICAL FIELD

This application relates generally to a method for evaluating software and, more specifically, to a method for evaluating the compliance of software to a quality benchmark.

BACKGROUND

Over the past several years, software has taken an increasingly important role in the efficient execution of several types of business processes. In fact, software continues to provide much of the infrastructure for reliability and flexibility of automated equipment, whereby older equipment systems are upgraded and modernized through the application and implementation of software systems. In many cases, a software application defines the operability of a particular hardware system. In business processes that rely heavily on efficient use of automated equipment and reliability and repeatability of the functionality of the equipment, it is imperative that the software applications associated with the equipment perform efficiently and predictably.

Traditionally software solutions are designed, developed, and tested in phases, each phase relying heavily on trial and error design processes. Often, software systems or applications are integrated into the business process in small test batches to ensure that the software system is operating predictably and reliably before the systems are deployed throughout the business process. However, in high volume enterprises it may be beneficial to implement new or upgraded software systems efficiently and reliably in a much shorter timeframe than traditional systems. Furthermore, it may be beneficial to evaluate a particular software system based upon a correlation of the software system with a benchmark corresponding to the particular business process that may be implemented.

The disclosed methods and systems for evaluating the compliance of software to a quality benchmark are directed toward overcoming one or more of the problems set forth above.

SUMMARY

In accordance with one aspect, the present disclosure is directed toward a method for evaluating the compliance of software to a standard quality process includes establishing a standard quality process that includes a plurality of stages, each of the plurality of stages corresponding to a software development process. A plurality of objective qualifiers associated with the standard quality process may be defined, and a weighting factor may be assigned to each of the plurality of objective qualifiers. The method may also include applying each of the plurality of objective qualifiers to a software application, and determining a field worthiness score corresponding to the correlation of the software with each of the objective qualifiers.

According to another aspect, the present disclosure is directed toward a computer-readable medium for use on a computer system, the computer-readable medium having computer-executable instruction for performing a method for evaluating the compliance of software to a standard quality process. The method may include comparing a software application to a plurality of objective qualifiers associated with a predetermined standard quality process having a plurality of stages, each of which may correspond to a software development process. Each of the plurality of objective qualifiers may be weighted according to a weighting criteria. The method may also include determining, based on the comparison, a field worthiness score corresponding to the correlation of the software with each of the objective qualifiers.

In accordance with yet another aspect, the present disclosure is directed toward a computer system that includes a display, at least one input device, and a processor in communication with the display and the at least one input device. The processor may be configured to compare a software application to a plurality of objective qualifiers associated with a predetermined standard quality process having a plurality of stages, each which may correspond to a software development process. Each of the plurality of objective qualifiers may be weighted according to a weighting criteria. The processor may also be configured to determine, based on the comparison, a field worthiness score corresponding to the correlation of the software application with each of the objective qualifiers.

BRIEF DESCRIPTION OF THE DRAWINGS

FIG. 5 is an exemplary embodiment of a field worthiness evaluation report for new software releases, referred to as Automation Equipment Plan (AEP).

FIG. 6 is an exemplary embodiment of a field worthiness report for maintenance releases of existing software, referred to as Mail Processing Equipment (MPE).

DETAILED DESCRIPTION

One embodiment of an evaluation tool to assess the "field worthiness" of software produced by and/or for engineering equipment and systems includes the Field Worthiness Evaluation Report (FWER) that is used by the Engineering Software Process Management (SPM) group of the United States Postal Service (USPS). Effectively, such evaluation tools are a measure of compliance of a software project to the engineering software quality process referred to as the Software Development Life Cycle (SDLC). The more a project follows the defined SDLC quality process, the more likely the software application will meet the required quality standards that allow software to be released to the field operating environment. One example of SDLC includes a five-phase process including: Requirements Definition, Project Planning and Design, Build, Test, and Deliver—each phase having several sub-elements.

In certain embodiments, there are two versions of the FWER. One is tailored for maintenance releases of existing software applications, for example the USPS MPE FWER, standing for the schedule of Mail Processing Equipment software releases. The other is tailored for new acquisitions of software applications, such as the USPS AEP FWER, standing for the Automation Equipment Plan schedule.

In one embodiment, the FWER includes a color-coded method of evaluating software application projects, but this embodiment may be prone to subjective judgment and interpretation, which can lead to a lack of evidence for scoring results and disagreements among the participants in a software project.

Another embodiment is the "quantified FWER", which uses evaluation criteria that are non-ambiguous and fact based. This embodiment uses sets of questions for each phase/sub-element, which consist of "Yes/No" questions, the answers to which are based upon facts—artifacts, content, completeness, conformance to plan/schedule, etc. According to one embodiment, the questions and answers for each phase/sub-element may be embedded in an Excel workbook, where the "Yes/No" answers drive a calculation engine, producing an unambiguous score for each sub-element. These scores are applied to weighted values, and automatically rolled-up and summed on a summary sheet. The summary allows a final determination of the field worthiness (i.e., conformance to the SDLC) of a given software application project. The weighting of the phases and sub-elements may represent the believed importance of each item in comparison to others and in the context of the entire project life cycle. The summary may be used as a management tool to determine whether or not to release the software to the field, or at least to point to areas of risk, so that if the business case requires the release, the stakeholders would be aware to the issues. Further, the FWER results may be used to identify areas of weakness in the process, to prioritize improvement strategies, and to point to areas where improved management oversight may be warranted.

Figure 1:
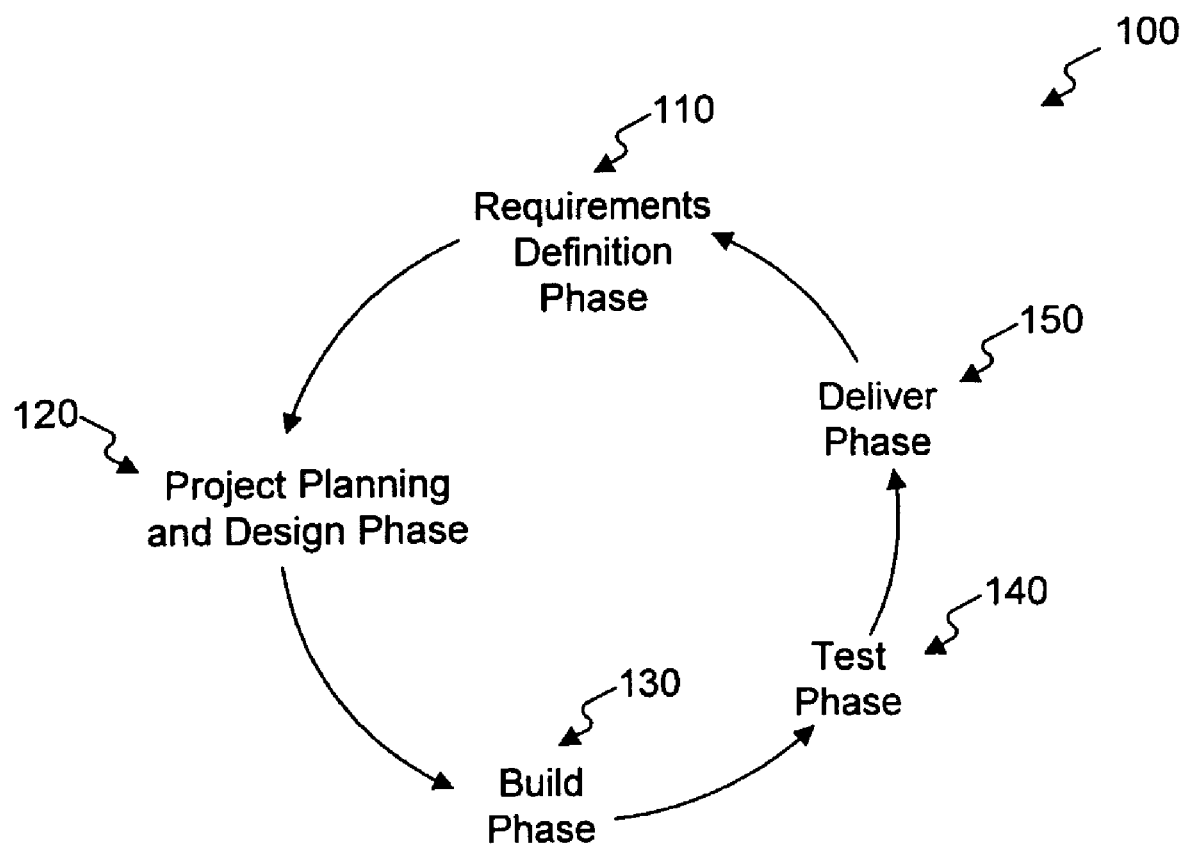
FIG. 1 is a diagram of an exemplary standard quality process.

FIG. 1 is a diagram of an exemplary standard quality process. As illustrated in flowchart 100 of FIG. 1, a standard quality process 100 describes the development of a software application within an operating environment. Standard quality process 100 may be implemented as a standard (or benchmark) for a particular business model or software control process where several software systems interact, where there may be a need to ensure that each software system is developed in substantially the same way. Standard quality process 100 may be defined as a Software Development Life Cycle (SDLC), wherein a software system developed using the Software Development Life Cycle should meet a pre-determined quality standard to allow implementation. Although standard quality process 100 is illustrated as the Software Development Life Cycle, it is conceived that standard quality process 100 may include any such quality standard known in the art for determining the worthiness of software for implementation into a system or process.

As shown, standard quality process 100 may be divided into several sub-phases 110-150, wherein each phase may further define various functions of one or more portions of the development process. For example, exemplary disclosed standard quality process 100 may include a requirements definition phase 110, a project planning and design phase 120, a build phase 130, a test phase 140, and a deliver phase 150. Each phase may be defined according to the role a respective phase takes within the software development process.

The requirements definition phase 110 of standard quality process 100 may include the initial definitions of the requirements of a particular software system. The requirements definition phase may set forth desired functionality of a software system, including the problem solving techniques proposed to define the software solution. For example, for a maintenance release or update of an existing software system, the requirements definition phase 110 may include evaluation of one or more aspects of the updated software such as the past performance of the software, the change request documentation, the statement of work/task order, and software requirement specification. Alternatively, for a new software system, the requirements definition phase 110 may include evaluation of one or more initial characteristics of the new software package, such as desired capabilities, statement of work/task order, software requirements specification, and system/subsystem design description. Requirements definition phase 110 may further include additional evaluation criteria known in the art to ensure proper definition of the functional requirements of a software system.

The project planning and design phase 120 of standard quality process 100 may include specifications for the planning and design of a particular software system. Project planning and design phase 120 may set forth the definitions for the systematic and structural development for the design and function of the software system. For example, for a maintenance release of existing software or for a new software system, the project planning and design phase 120 may include the evaluation of one or more of the software management configuration plan, the software design description, the traceability of the requirements, the software test plan, the software management test plan, the software quality assurance plan, and the proposed implementation schedule. Project planning phase 120 may further include additional evaluation criteria known in the art to ensure proper planning and design of a software system.

The build phase 130 of standard quality process 100 may include specifications for the construction of the software program. Build phase 130 may establish the specific requirements set forth for the development of the software platform. For example, for a new software systems or a software system upgrade, the build phase 130 may include one or more of the evaluation of the software version description, the project development environment, the software release archive, and the software test descriptions. Build phase 130 may further include additional evaluation criteria known in the art to ensure proper construction and assembly of a software system.

The test phase 140 of standard quality process 100 may set forth the requirements for testing and/or debugging of the software program. Test phase 140 may define the specific requirements ensuring that the software program has been sufficiently tested and the test results appropriately documented. For example, for a new software system or an upgrade to an existing software system, test phase 140 may include evaluation or audit of one or more of the independently built software systems, the software version description and associated documentation, the documentation for the in-plant test results, the reports for the first article test results, and the documentation for any beta-test results performed. The evaluation in test phase 240 may also include the review of the standard documentation of any tests performed and the adherence of the tests to existing industry standards. Test phase 140 may further include additional evaluation criteria known in the art to ensure proper testing of a software system.

The deliver phase 150 of standard quality process 100 may define the specification for the appropriate delivery of the software system. Deliver phase 150 may establish the guidelines and requirements for the physical delivery of the software systems to the associated equipment system. For example, for a new software system or an upgrade to an existing software system, deliver phase 150 may include the evaluation of one or more of the final field notifications and associated documentation, the engineering software change order, the software media duplication for the backup of the software, the authorization to install the software, the product announcement, and the deliverables schedule. Deliver phase 150 may further include additional evaluation criteria known in the art to ensure proper delivery of a software system.

Figure 2:
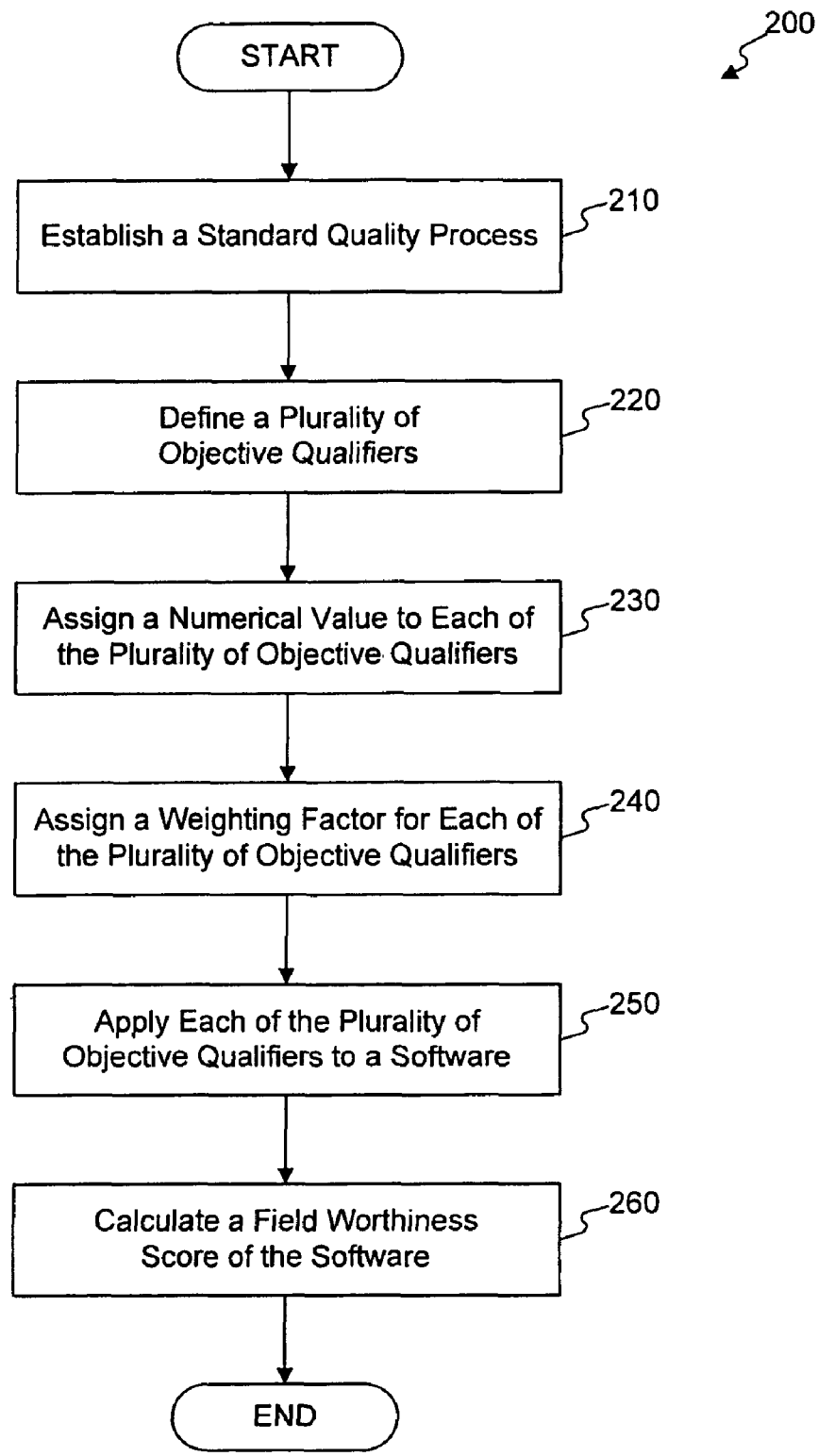
FIG. 2 is an illustration of an exemplary method for evaluating the compliance of software to a quality benchmark.

FIG. 2 is an illustration of an exemplary method for evaluating the compliance of a software-based system. As shown in flowchart 200 of FIG. 2, upon establishing a standard quality process (stage 210) which may be used for the uniform development of software applications for a plurality of equipment systems, a plurality of objective qualifiers may be defined for objective determination of the adherence of a new or existing software applications to standard quality process 100 (stage 220). For example, the definition of objective qualifiers may include establishing a plurality of "yes/no" questions corresponding to specific requirements or specifications of standard quality process 100, as shown in flowchart 300 of FIG. 3. Alternatively, the definition of objective qualifiers may include other methods of objective analysis such as, for example, a checklist, a punch list, a "true/false" system, or any other objective method known in the art for objective determination of adherence of one or more software systems to a software development process.

The defined objective qualifiers may be assigned a numerical value and weighting factor corresponding to the determination of the conformance of the software system to standard quality process 100 and the importance of the objective qualifier in determining conformance of the software system to standard quality process 100, respectively (stages 230 and 240). In similar fashion to the assignment of numerical values to the responses, as in the foregoing example, the assignment of numerical values and weighting factors to the objective qualifiers serves to provide a raw data indication and a priority of the particular objective qualifier to a calculation system, based upon the qualification of the software system in view of standard quality process 100.

Each of the plurality of objective qualifiers may be applied to a particular software program in order to evaluate correlation of the development of the software program to standard quality process 100 (stage 250), resulting in the calculation of a field worthiness score which may be indicative of the correlation (stage 260). The field worthiness score may correspond to how closely the development of the software program may have followed the standard guidelines established by the standard quality process 100. The field worthiness score may be an indication of a potential ability of the software program to be deployed or implemented in a software-based system or process. The field worthiness score may also be used to address potential risk factors associated with the deployment of the software program or insufficiencies in the cooperation of the program with other applications developed using standard quality process 100.

Figure 3:
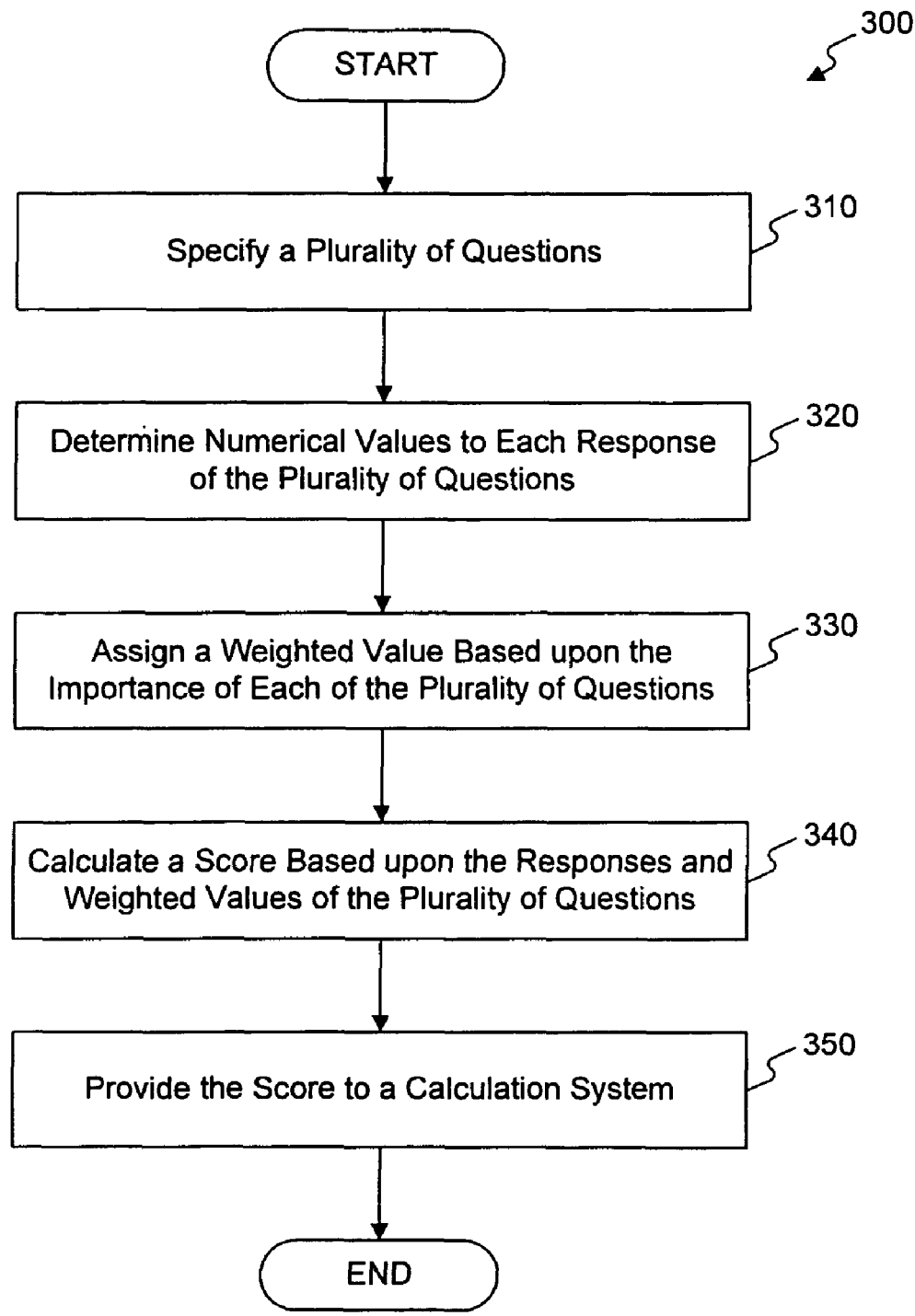
FIG. 3 is an illustration of an exemplary method for defining a plurality of objective qualifiers.

FIG. 3 is an illustration of an exemplary method for defining a plurality of objective qualifiers. As illustrated in flowchart 300 of FIG. 3, defining a plurality of objective qualifiers may be initiated by one or more questions directed to deliver a response indicative of the comparison to standard quality process 100 (stage 310). For example, a question may be directed to whether a previous software application version required an emergency patch to correct flaws in the previous software version. A "yes" response may indicate that a previous performance problem existed. A "no" response may indicate that the previous performance problem did not exist. These questions may contribute to the analysis of the requirements definition phase of the software update. Likewise, the one or more questions developed to define the plurality objective qualifiers may contribute to the determination of the overall compliance of a new or updated software system to standard quality process 100.

Upon specifying the one or more questions which may serve as the objective qualifiers, numerical values may be assigned to each response of one or more questions, wherein the numerical values may provide a raw data value for each of the respective responses (stage 320). As in the example above, a "yes" response may be assigned a numerical value indicative of the contribution that the correction of flaws may have on the standard quality process. For example, the numerical value of 0 may be assigned to a "yes" response, since an emergency patch to correct a potential performance flaw of a previous version has no contribution to the quality of the past performance. Likewise, a "no" response may be assigned a different numerical value indicative of the contribution that the lack of the correction of flaws may have on standard quality process 100. For example, the numerical value of 50 may be assigned to a "no" response, since the past performance was such that an emergency patch was not required to address a potential flaw. The numerical values provide a raw data value, which may be further analyzed to assist in the evaluation of the software system.

According to another exemplary embodiment, questions may be directed toward one or more activities associated with a particular software development entity (e.g., software development business unit of USPS, independent software development firm, software contractor, etc.). For example, in determining the field worthiness score associated with a project planning and design phase, one or more questions may be directed toward objectively analyzing the compliance of the activities of a software developer with one or more deliverables required by a statement of work under which the software application was developed. These questions may be directed, for example, to whether a software developer delivered a software design description (SDD) in accordance with the provisions of the statement of work (SOW), whether a software project manager has evaluated the SDD to ensure accordance with any applicable standards; whether the project manager has accepted the SDD from the developer; and whether any issues associated with the SDD have been appropriately resolved in accordance with the SOW. "Yes" responses to each of these questions may indicate compliance of the software design process to the SOW. Points may be awarded for "yes" responses based on the predetermined value that each planning milestone plays in the overall quality of the software application. This predetermined value may be based on empirical data collected from past software development processes.

Similarly, "no" answers to these objective questions may indicate a non-compliance of the software application with one or more project planning and design phase elements. Accordingly, "no" responses may be assigned predetermined numerical values indicative of the impact that non-compliance may have on the overall quality of the software application. As indicated above, this value may be quantified based on experimental data from previous software development process. According to one embodiment, non-compliance may have no impact and may be assigned a value of "0". It is contemplated, however, that in certain other cases, non-compliance may have a negative impact on the software application and may be assigned a negative value. For example, historical test data may indicate that a failure to obtain final approval for an SDD, where all other requirements have been met, has no impact on the compliance of the final software application to the benchmark. In contrast, failure to provide an SDD altogether may actually have a negative impact on the compliance of the software application to the quality benchmark.

According to another exemplary embodiment, one or more questions may be directed toward a software version description (SVD) associated with the build phase of the software development life cycle. The SVD may include one or more aspects associated with bug and/or virus vulnerability of the software application, system requirements (e.g., operating systems, software interface requirements, etc.), data recovery features and/or procedures, or any other critical information. For example, one question may be directed toward whether the SVD complies with a standard SVD template. A "yes" response may indicate that the SVD may be implemented directly with one or more existing software applications without SVD modification and/or standardization. Consequently, a "yes" response may be assigned a predetermined numerical value corresponding to the contribution that this compliance may have on standard quality process 100. A "no" response may be assigned a numerical value of "0", as the lack of compliance of the SVD with the SVD template provides no contribution to the overall compliance of the software application to the standard quality process 100.

In additional to the assignment of numerical values for the responses to each of the one or more questions, a weighting value may be assigned to each of the one or more responses (stage 330). Assignment of the weighting value for each of the one or more questions may include determination of the importance that each of the one or more questions may have to the overall determination of the software system's conformance to standard quality process 100. For example, it may be determined that questions related to the test phase of the software system may have significantly less impact on the evaluation of the software system than the requirements determination phase. Therefore, questions related to the requirements definition phase may be assigned a weighting value indicative of the importance of those questions in relation to the questions corresponding to the test phase. This may ensure that each of the phases of standard quality process 100 may be appropriately evaluated.

Calculation of a score based upon tabulation of the values corresponding to the responses of the one or more questions and the respective weighting values of each of the one or more questions may be performed (stage 340) and the results may be provided to a calculation system for further analysis (stage 350). The calculation of the score may include inputting the raw data values in a tabular form, applying the weighting values to the raw data thereby providing corrected data, and determining a score for each of the one or more phases of the software system with respect to standard quality process 100. The calculation may be performed by any number of appropriate methods known in the art for performing general calculation on raw parametric data such as, for example, a computer program, a calculating device, a digital logic circuit, or any other calculation method. The data may then be provided to an associated calculation system, which may further analyze the raw and/or corrected data values for broader analysis.

As described thus far, the evaluation of the compliance of a software application may be used to objectively evaluate any software that may be implemented within a software-based system. In one exemplary disclosed embodiment, a software system may be evaluated with respect to the correlation of the software system to a standard quality process 100 to determine a field worthiness score corresponding to the potential ability of the software application program to be deployed in a business process. An exemplary system for applying the disclosed evaluation method will now be described in detail.

Figure 4:
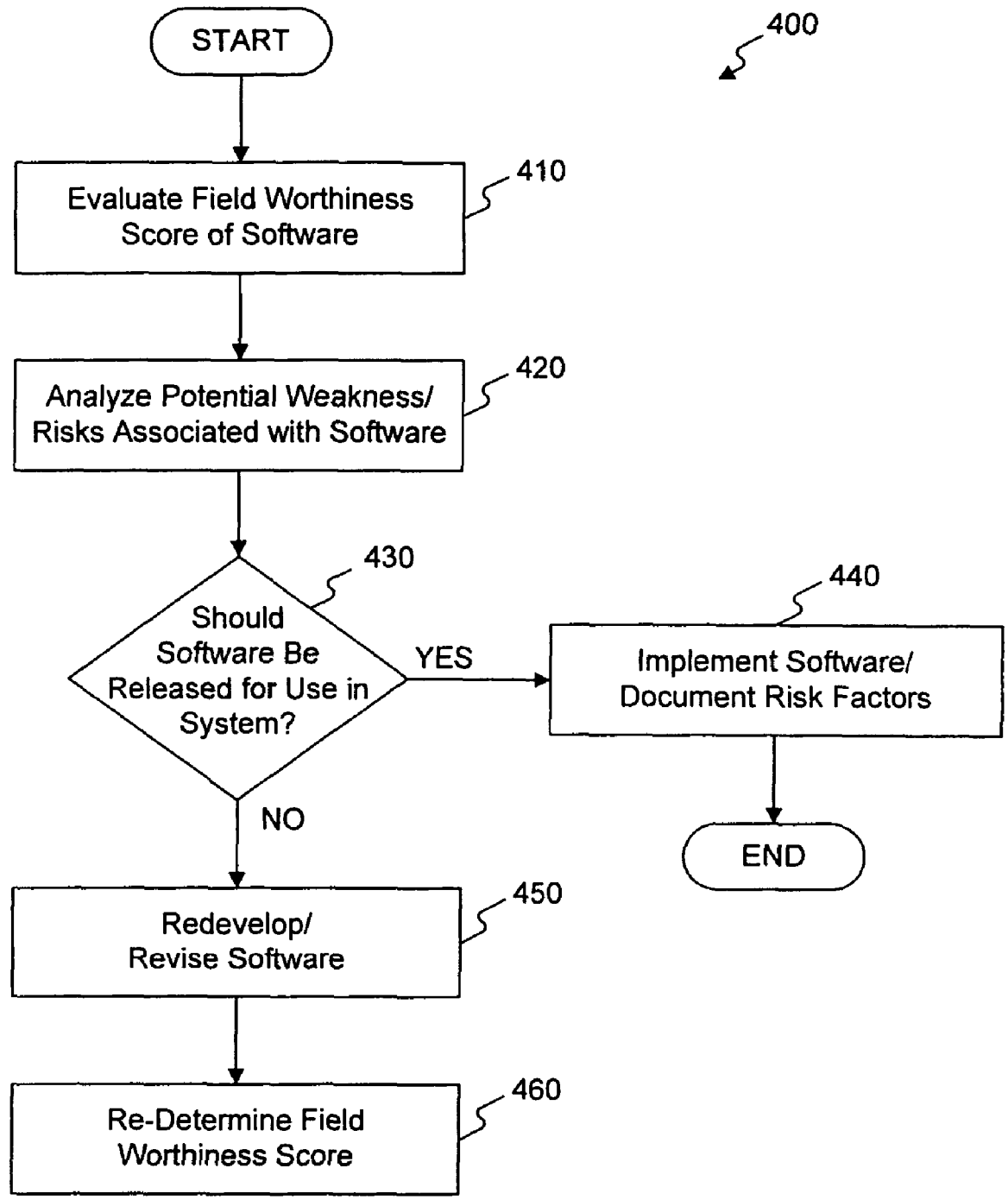
FIG. 4 is an illustration of an exemplary disclosed method for employing a method for evaluating the compliance of software to a quality benchmark within a business process.

FIG. 4 is an illustration of an exemplary disclosed method for employing a method for evaluating the compliance of a software-based system within a business process. As illustrated in flowchart 400 of FIG. 4, a field worthiness score is determined according to the exemplary method for evaluation of the compliance of software, for example, as illustrated in flowchart 200 (stage 410). The field worthiness score, when viewed in context with the standard quality process 100, may provide an indication of potential risk factors or problem areas associated with the software (stage 420). For example, in evaluation of the compliance of the software system with the requirements definitions phase 110 of standard quality process 100, low corrected values corresponding to the compliance of the software system to requirements definitions phase 110 may indicate that the software system may not have an adequate preliminary definition of desired functionality. In such circumstances, a software management team may choose to evaluate the functionality of the software system more closely prior to deploying the system in the field.

After the potential risks and weaknesses have been evaluated, a decision may be made as to whether the software application could be effectively deployed (stage 430). Although the decision may be based upon the field worthiness score and/or report, this decision may be subjective. A determination to deploy the software system may be accompanied by documenting any potential risk factors that may exist along with the implementation of the software system within the software-based environment (stage 440). Alternatively, if the decision is made not to release the software system, the software may be redeveloped or revised, based upon determination of the software development management team (stage 450), wherein any subsequent versions of the software system may be re-evaluated by the disclosed method for software evaluation (stage 460). Re-evaluation of the software system would essentially require that any subsequent revisions would be applied to the same "quantified FWER," as disclosed, for example, in flowchart 200, so that any revisions that were made may be included in the report.

The method described in FIG. 4 for the evaluation of the compliance of software has several advantages. For example, since a software system is evaluated based upon the conformance of the system to a standard quality process, each new software system may be objectively analyzed based upon the same criteria as each existing software system. This may provide a standard measure for each particular software system, thereby providing a more reliable evaluation method than other evaluation systems, which may use only function-based evaluation methods.

The method of FIG. 4 may thus reduce the need for trial and error software development, as the disclosed method for evaluation of software compliance provides an objective analysis on how closely a particular software development process corresponds to a standard quality process. Since this method may be highly repeatable, with substantially similar results, a determination can be made during each phase of the software design process of how closely the developing software meets the standard specification. This may substantially reduce the time required to complete the software development process, thereby reducing the development costs and providing a more reliable field deployable software product.

The exemplary disclosed field worthiness evaluation reports of FIG. 5 and FIG. 6 are examples of reports for Automated Equipment Programs and Mail Processing Equipment embodiments, respectively. FIG. 5 is an exemplary embodiment of a field worthiness evaluation report for new software releases, referred to as Automation Equipment Plan (AEP). FIG. 6 is an exemplary embodiment of a field worthiness report for maintenance releases of existing software, referred to as Mail Processing Equipment (MPE). In FIGS. 5 and 6, each phase of standard quality process 100 is defined in detail, with a plurality of objective qualifiers corresponding to each phase, as shown.

Each of the plurality of objective qualifiers may be associated with a plurality of "yes/no" questions, each question assigned a point value for each response. According to one embodiment, the plurality of objective qualifiers and/or the plurality of objective questions may each be directed to one or more aspects associated with the software development process. For example, one or more of the plurality of objective questions (and the responses thereto) may be directed toward determining how closely one or more aspects of the software application correlate with predetermined benchmarks established prior to the development of the software.

Figure 7:
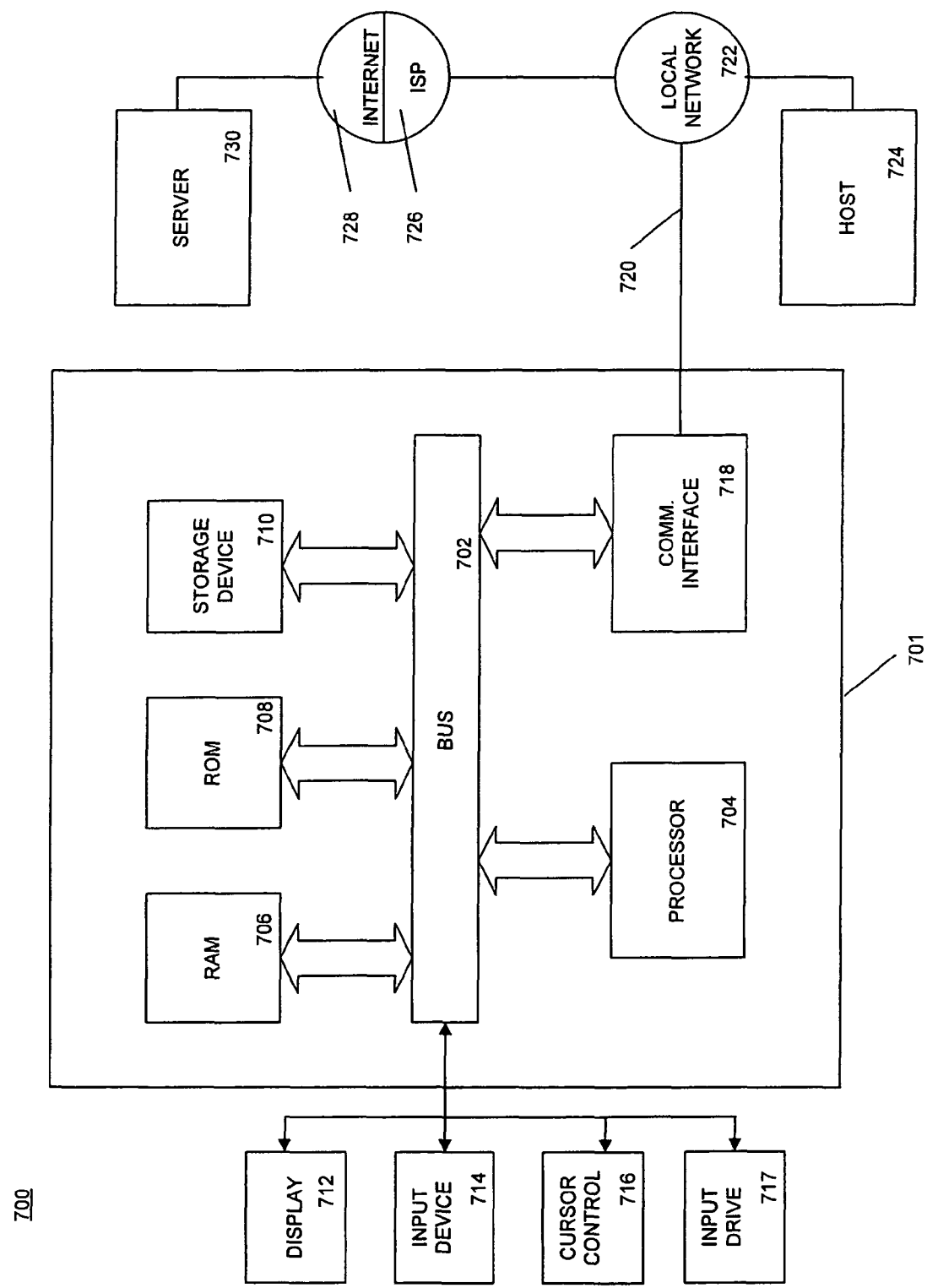
FIG. 7 is an illustration depicting an exemplary computer system in which systems and methods consistent with the principles of FIG. 2 may be implemented.

Systems and methods consistent with the present invention may be implemented by computers organized in a conventional distributed processing system architecture. FIG. 7 is a block diagram illustrating a computer system 700 in which an embodiment consistent with the invention may be implemented. Computer system 700 includes a computer 701 having a bus 702 or other communication mechanism for communicating information, and a processor 704 coupled with bus 702 for processing information. Computer 701 also includes a main memory, such as random access memory (RAM) 706 or other dynamic storage device, coupled to bus 702 for storing information and instructions by processor 704. RAM 706 also may be used for storing temporary variables or other intermediate information during execution of instructions to be executed by processor 704. During operation, some or all portions of an operating system (not shown) are loaded into RAM 706. Computer 701 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer 701 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball or cursor direction keys for communicating direction information and command selections to processor 704 and for controlling cursor movement on display 712. This input device may have two degrees of freedom in two axes, a first axis (e.g., x) and a second axis (e.g., y), which allow the device to specify positions in a plane.

System 700 may further include an input drive device 717, such as a CD reader, for reading high capacity computer-readable media, such as CD-ROMs and CDRs.

The invention is related to the use of computer system 700 for evaluating software to a benchmark. According to one implementation, systems and methods consistent with the present invention use processor 704 to execute one or more sequences of one or more instructions contained in RAM 706. Such instructions may be read into RAM 706 from a computer-readable medium via an input device such as storage device 710. Execution of the sequences of instructions contained in main memory 706 causes processor 704 to perform the process steps described herein. In an alternative implementation, hard-wired circuitry may be used in place of or in combination with software instructions to implement the invention. Thus, implementations consistent with the principles of the present invention are not limited to any specific combination of hardware circuitry and software.

Computer 701 also includes a communication interface 718 coupled to bus 702. Communication interface 718 provides a two-way data communication coupling to a network link 720 that is connected to local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to host computer 724 and/or to data equipment operated by Internet Service Provider (ISP) 726. ISP 726, in turn, provides data communication services through the Internet 728. Local network 722 and Internet 728 both use electric, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be loaded in RAM 706 and executed by processor 704 as it is received. Alternatively, or in addition, it may be stored in storage device 710, or other non-volatile storage for later execution. In this manner, computer system 700 may obtain application code in the form of a carrier wave.

Although computer system 700 is shown in FIG. 7 as being connectable to one server 730, those skilled in the art will recognize that computer system 700 may establish connections to multiple servers on Internet 728. Such servers may include an HTML-based Internet application, which may provide information to computer system 700 upon request in a manner consistent with the present invention.

The foregoing descriptions of the invention have been presented for purposes of illustration and description. They are not exhaustive and do not limit the invention to the precise form disclosed. Modifications and variations are possible in light of the above teachings or may be acquired from practicing of the invention. For example, the described implementation includes software but the present invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM.

It will be apparent to those skilled in the art that various modifications and variations can be made to the methods and systems without departing from the scope of the invention. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method for evaluating the compliance of a software comprising:
   accepting on the computer system an establishing of a standard quality process that includes a plurality of stages, each of the plurality of stages corresponding to a software development process;
   accepting on the computer system a defining of a plurality of objective qualifiers associated with the standard quality process, each of the plurality of objective qualifiers having an enumerated plurality of potential values;
   accepting on the computer system an assigning of a weighting factor to each of the potential values for each of the plurality of objective qualifiers;
   accepting on the computer system results of applying each of the plurality of objective qualifiers to a software application; and
   determining a field worthiness score corresponding to the correlation of the software application with each of the objective qualifiers utilizing the computer system; wherein determining the field worthiness score includes: determining, based on the determined responses, a raw score associated with each of the plurality of objective qualifiers, wherein the raw score is calculated as the sum of the values corresponding to responses to each of the plurality of questions; and calculating the field worthiness score as the sum of the raw scores associated with each of the plurality of objective qualifiers, wherein each raw score is adjusted by the weighting factor associated with a corresponding objective qualifier; comparing the field worthiness score to a predetermined threshold; approving, if the field worthiness score exceeds the predetermined threshold, an implementation of the software application; and determining, if the field worthiness score does not exceed a predetermined threshold, that the software application requires further development prior to implementation.

2. The method of claim 1, wherein the standard quality process includes a software development life cycle associated with the development of one or more software programs.

3. The method of claim 2, wherein the software development life cycle includes at least one of a requirement definition phase, a project planning and design phase, a build phase, a test phase, or a deliver phase.

4. The method of claim 1, wherein defining a plurality of objective qualifiers includes developing, for each of the plurality of objective qualifiers, a plurality of objective questions, wherein each possible response to each of the plurality of objective questions is assigned a value.

5. The method of claim 4, wherein applying each of the plurality of objective qualifiers to the software application further includes:
   analyzing the software application; and
   determining a response to one or more of the plurality of questions based on the analysis.

6. The method of claim 5, further including documenting one or more of the field worthiness score and the raw score associated with each of the plurality of objective qualifiers for future analysis.

7. The method of claim 6, further including providing a report indicative of a potential risk associated with the software application based on the raw score associated with each of the plurality of objective qualifiers.

8. The method of claim 5, wherein analyzing the software application includes evaluating at least a portion of the software application using a predetermined benchmark associated with the software development process.

9. The method of claim 8, wherein the predetermined benchmark includes a statement of work under which the software application was developed.

10. The method of claim 9, wherein the predetermined benchmark includes a predefined software evaluation checklist.

11. The method of claim 1, further including providing a report indicative of a potential risk associated with the software application based on the field worthiness score.

12. The method of claim 1, wherein the weighting factor is predetermined based on a desired level of importance that each of the plurality of object qualifiers has in determining the field worthiness score.

13. The method of claim 12, wherein the desired level of importance is based on empirical data gathered from a previous software development process.

14. A computer-readable storage medium for use on a computer system, the computer-readable medium containing computer-executable instructions for performing a method on a computer system comprising:
   comparing a software application to a plurality of objective qualifiers associated with a predetermined standard quality process, the standard quality process having a plurality of stages, each of the plurality of stages corresponding to a software development process, wherein each of the plurality of objective qualifiers has an enumerated plurality of potential values, each of which is weighted according to a weighting criteria; and
   determining, based on the comparison a field worthiness score corresponding to the correlation of the software application with each of the objective qualifiers; determining the field worthiness score includes: determining, based on the determined responses, a raw score associated with each of the plurality of objective qualifiers, wherein the raw score is calculated as the sum of the values corresponding to responses to each of the plurality of questions; and calculating the field worthiness score as the sum of the raw scores associated with each of the plurality of objective qualifiers, wherein each raw score is adjusted by a weighting factor associated with a corresponding objective qualifier;
   comparing the field worthiness score to a predetermined threshold;
   approving, if the field worthiness score exceeds the predetermined threshold, an implementation of the software application; and
   determining, if the field worthiness score does not exceed a predetermined threshold, that the software application requires further development prior to implementation.

15. The computer-readable medium storage of claim 14, wherein the standard quality process includes a software development life cycle associated with the development of one or more software programs.

16. The computer-readable medium storage of claim 15, wherein the software development life cycle includes at least one of a requirement definition phase, a project planning and design phase, a build phase, a test phase, or a deliver phase.

17. The computer-readable medium storage of claim 14, wherein the plurality of objective qualifiers includes a plurality of objective questions, wherein each possible response to each of the plurality of objective questions is assigned a value.

18. The computer-readable medium storage of claim 17, wherein comparing the software application to a plurality of objective qualifiers further includes:
    analyzing the software application; and
    determining a response to one or more of the plurality of questions based on the analysis.

19. The computer-readable storage medium of claim 18, wherein the method further includes documenting one or more of the field worthiness score and the raw score associated with each of the plurality of objective qualifiers for future analysis.

20. The computer-readable storage medium of claim 19, wherein the method further includes providing a report indicative of a potential risk associated with the software application based on the raw score associated with each of the plurality of objective qualifiers.

21. The computer-readable storage medium of claim 18, wherein analyzing the software application includes evaluating at least a portion of the software application using a predetermined benchmark associated with the software development process.

22. The computer-readable storage medium of claim 21, wherein the predetermined benchmark includes a statement of work under which the software application was developed.

23. The computer-readable storage medium of claim 21, wherein the predetermined benchmark includes a predefined software evaluation checklist associated with the software development process.

24. The computer-readable storage medium of claim 14, wherein the weighting criteria is predetermined based on a desired level of importance that each of the plurality of object qualifiers has in determining the field worthiness score.

25. The computer-readable storage medium of claim 24, wherein the desired level of importance is based on empirical data gathered from a previous software development process.

26. The computer-readable storage medium of claim 14, wherein said method further includes providing a report indicative of a potential risk associated with the software application based on the field worthiness score.

27. A computer system, comprising:
    a display;
    at least one input device; and
    a processor in communication with the display and the at least one input device and programmed to:
        compare a software application to a plurality of objective qualifiers associated with a predetermined standard quality process, the standard quality process having a plurality of stages, each of the plurality of stages corresponding to a software development process, wherein each of the plurality of objective qualifiers has an enumerated plurality of potential values, each of which is weighted according to a weighting criteria; and
        determine, based on the comparison a field worthiness score corresponding to the correlation of the software application with each of the objective qualifiers; wherein determining the field worthiness score includes:
            determining, based on the determined responses, a raw score associated with each of the plurality of objective qualifiers, wherein the raw score is calculated as the sum of the values corresponding to responses to each of the plurality of questions; and
            calculating the field worthiness score as the sum of the raw scores associated with each of the plurality of objective qualifiers, wherein each raw score is adjusted by a weighting factor associated with a corresponding objective qualifier;
        wherein the processor is further configured to: compare the field worthiness score to a predetermined threshold;
        approve, if the field worthiness score exceeds the predetermined threshold, an implementation of the software application; and
        determine, if the field worthiness score does not exceed a predetermined threshold, that the software application requires further development prior to implementation.

28. The computer system of claim 27, wherein the standard quality process includes a software development life cycle associated with the development of one or more software programs.

29. The computer system of claim 28, wherein the software development life cycle includes at least one of a requirement definition phase, a project planning and design phase, a build phase, a test phase, or a deliver phase.

30. The computer system of claim 27, wherein the plurality of objective qualifiers includes a plurality of objective questions, wherein each possible response to each of the plurality of objective questions is assigned a value.

31. The computer system of claim 30, wherein comparing the software application to a plurality of objective qualifiers further includes:
    analyzing the software application; and
    determining a response to one or more of the plurality of questions based on the analysis.

32. The computer system of claim 31, wherein the processor is further configured to document one or more of the field worthiness score and the raw score associated with each of the plurality of objective qualifiers for future analysis.

33. The computer system of claim 32, wherein the processor is further configured to provide a report indicative of a potential risk associated with the software application based on the raw score associated with each of the plurality of objective qualifiers.

34. The computer system of claim 31, wherein analyzing the software application includes evaluating at least a portion of the software application using a predetermined benchmark associated with the software development process.

35. The computer system of claim 34, wherein the predetermined benchmark includes a statement of work under which the software application was developed.

36. The computer system of claim 34, wherein the predetermined benchmark includes a predefined software evaluation checklist associated with the software development process.

37. The computer systems of claim 27, wherein the weighting criteria is predetermined based on a desired level of importance that each of the plurality of object qualifiers has in determining the field worthiness score.

38. The computer system of claim 37, wherein the desired level of importance is based on empirical data gathered from a previous software development process.

39. The computer system of claim 27, further including providing a report indicative of a potential risk associated with the software application based on the field worthiness score.

* * * * *